US010741216B2

(12) United States Patent
Kulas

(10) Patent No.: US 10,741,216 B2
(45) Date of Patent: *Aug. 11, 2020

(54) VIDEO TAG LAYOUT

(71) Applicant: Gula Consulting Limited Liability Company, Dover, DE (US)

(72) Inventor: Charles J. Kulas, San Francisco, CA (US)

(73) Assignee: Gula Consulting Limited Liability Company, Dover, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/470,903

(22) Filed: Mar. 27, 2017

(65) Prior Publication Data

US 2017/0200475 A1  Jul. 13, 2017

Related U.S. Application Data

(63) Continuation of application No. 11/778,004, filed on Jul. 13, 2007, now Pat. No. 9,609,260.

(51) Int. Cl.
*G11B 27/036* (2006.01)
*G06F 16/78* (2019.01)
(Continued)

(52) U.S. Cl.
CPC ........ *G11B 27/036* (2013.01); *G06F 16/7867* (2019.01); *G06Q 30/06* (2013.01);
(Continued)

(58) Field of Classification Search
CPC ........... G06Q 30/0241; G06Q 30/0601; G06Q 30/06; H04N 21/25435; H04N 21/2543; H04N 21/485; H04N 21/4722; H04N 5/44543; G11B 27/036; G11B 27/322; G06F 16/7867

See application file for complete search history.

(56) References Cited

U.S. PATENT DOCUMENTS 5,929,849 A  7/1999  Kikinis
6,580,870 B1  6/2003  Kanazawa et al.
(Continued)

OTHER PUBLICATIONS

Butler, Phil, Mojiti—Testing for Fun, Profy, http://profy.com/2007/01/29/mojiti-bubbles/ (Jan. 29, 2007).
(Continued)

*Primary Examiner* — Kunal Langhnoja

(57) ABSTRACT

A first method utilizes placeholder tags to facilitate a user's adding a tag to a video scene during a production process of a video. The tag is associated with an item depicted in the video and characterized by size, shape, temporal duration, and spatial location properties with respect to the video scene. A second method facilitates a user's customizing a video scene during a production process of a video, wherein computer-generated graphic content (logo or brand name for the tagged item) is overlaid on the item depicted in the video and associated with the tag. A third method facilitates a user to add a tag to a video scene during a production process of a video, where the video scene is related to another video scene associated with the video, and the method stores data associated with said another video scene to note the tag.

36 Claims, 6 Drawing Sheets

(51) Int. Cl.
  *H04N 21/4722* (2011.01)
  *H04N 21/485* (2011.01)
  *G11B 27/32* (2006.01)
  *G06Q 30/06* (2012.01)
  *H04N 5/445* (2011.01)

(52) U.S. Cl.
  CPC ....... *G06Q 30/0601* (2013.01); *G11B 27/322* (2013.01); *H04N 5/44543* (2013.01); *H04N 21/4722* (2013.01); *H04N 21/485* (2013.01)

(56) References Cited

U.S. PATENT DOCUMENTS

| | | | |
|---|---|---|---|
| 7,027,101 B1 | 4/2006 | Sloo et al. | |
| 7,559,017 B2* | 7/2009 | Datar | G11B 27/11 715/230 |
| 7,877,689 B2 | 1/2011 | Gilley | |
| 8,176,513 B2 | 5/2012 | Halke et al. | |
| 8,180,200 B2 | 5/2012 | Hasek | |
| 2002/0073034 A1 | 6/2002 | Wagner et al. | |
| 2002/0078446 A1* | 6/2002 | Dakss | G06F 17/30855 725/37 |
| 2002/0112249 A1 | 8/2002 | Hendricks et al. | |
| 2004/0019524 A1* | 1/2004 | Marshall | G06Q 30/0242 705/26.1 |
| 2005/0031315 A1 | 2/2005 | Kageyama et al. | |
| 2005/0086690 A1 | 4/2005 | Gilfix et al. | |
| 2005/0229227 A1* | 10/2005 | Rogers | G06Q 30/02 725/115 |
| 2005/0278747 A1 | 12/2005 | Barton et al. | |
| 2006/0293954 A1* | 12/2006 | Anderson | G06Q 30/02 705/14.1 |
| 2007/0067707 A1* | 3/2007 | Travis | G11B 27/031 715/203 |
| 2007/0294622 A1 | 12/2007 | Sterner et al. | |
| 2008/0060003 A1 | 3/2008 | Nocifera et al. | |
| 2008/0077951 A1 | 3/2008 | Maggio et al. | |
| 2008/0162277 A1* | 7/2008 | Moonka | G06Q 30/02 705/14.68 |
| 2009/0100187 A1* | 4/2009 | Harris | G06Q 30/02 709/231 |
| 2011/0123167 A1* | 5/2011 | Li | H04N 5/772 386/224 |

OTHER PUBLICATIONS

De Rossi, Luigi Canali Subtitling and Dubbing Your Internet Video, http://www.masternewmedia.org/news/2007/02/06/subtitling_and_dubbing_your_internet.htm (Feb. 6, 2007).

Mojiti Video in Your Own Words, http://web.archive.org/web/20071009074408/http://mojiti.com/learn/personalize (Oct. 9, 2007).

Silberberg, Yoni, "New BubblePly.com Website Allows Users to Add Creative Layers on Top of Online Video," Jan. 29, 2007, http://bubbleply.com (4 pages).

* cited by examiner

| Tagged Item /402 | (Tag) /404 Time on Screen | Rating (1-5) /406 1 = best | Price (000's) /408 text + logo |
|---|---|---|---|
| Cell phone 1 | 21 | 1 | 80 |
| Cell phone 2 | 10 | 2 | 20 |
| Cell phone earpiece | 7 | 1 | 50 |
| Cell phone car adapter | 5 | 3 | 15 |
| . | | | |
| . | | | |
| . | | | |
| Sunglasses 1 | 6 | 1 | 50 |
| Sunglasses 2 | 4 | 4 | 30 |
| . | | | |
| . | | | |
| . | | | |
| Laptop | 6 | 2 | 60 |
| . | | | |
| . | | | |
| . | | | |
| Wristwatch | 7 | 3 | 50 |

VIDEO TAG LAYOUT

RELATED APPLICATIONS

This application is a continuation of U.S. patent application Ser. No. 11/778,004, filed on Jul. 13, 2007, entitled "VIDEO TAG LAYOUT," now U.S. Pat. No. 9,609,260. The entire disclosures of the foregoing patent application is hereby incorporated by reference herein.

SUMMARY OF THE DISCLOSURE

In one embodiment, a video tag layout tool is provided. During a production process for a video, such as when a digital video disk (DVD) or a video for broadcast is produced, video tags may be input into portions of the video. The video tags may provide information about items that are visible during video playback. The video tags can identify the brand name, item name, location where the item can be purchased, additional information about the item, etc. The tags can be turned on and off by the viewer or user during playback.

To provide the information in the video tags, an interface can be used by a user to input information about the video tag. During the production process, the interface may be used to indicate that a user (e.g., a sponsor) is interested in a video tag shown in a video sequence. For example, during shooting of the video, an interface may be used to input that a user is interested in a tag and also to indicate which information is desired for the tag. This allows users to indicate interest in sponsoring (e.g., purchasing) video tags before the final video is produced. Thus, producers of the video can see how much revenue can be derived from video tags if certain scenes or items are used in the video.

In one embodiment, a portion of a video sequence is displayed on an interface. A video tag is also displayed in the portion of the video sequence. In one embodiment, the video tag is a placeholder tag that shows where the tag would be displayed in the portion of the video sequence. An input area is then displayed that allows input of tag information for the video tag. For example, the user may specify what kind of tag they would like and also any information that can be displayed for the tag. For example, the user may specify that they would like the tag to be a text tag that includes the logo of the company.

A further understanding of the nature and the advantages of particular embodiments disclosed herein may be realized by reference of the remaining portions of the specification and the attached drawings.

BRIEF DESCRIPTION OF THE DRAWINGS

FIG. 4 depicts an example of a table that shows a summary of tagged items according to one embodiment.

DETAILED DESCRIPTION OF EMBODIMENTS

In one embodiment, the video playback is via a Digital Video Disc (DVD) player or through a set top box. A multi-angle feature of the player is used to allow a viewer to switch between tagged and non-tagged playback. In normal, non-tagged, playback the tags are not visible and an original video sequence (e.g., a television program, movie, etc.) is played normally. When a viewer presses a button a new video sequence that includes tags is selected. The new video sequence is synchronized to the original video sequence so that the effect is that the tags appear over the continuous action of the original video sequence. The viewer can turn off the tags by selecting the original sequence. Other embodiments described herein use different mechanisms for playback to achieve the same or similar effect.

Tags can be organized and displayed according to categories such as Design, Gadgets, Scene, etc. The Design category displays tags that deal with fashion, interior/exterior decorating, architecture, art, and similar types of items. The Gadgets category includes electronics, appliances, cars, etc. The Scene category provides information on colors, furniture, plants, locations, climate, etc. Other categories can be created, as desired. Tags of a specific category can be selected for independent display. Or categories can be combined to display tags from multiple categories on a same display.

Figure 1:
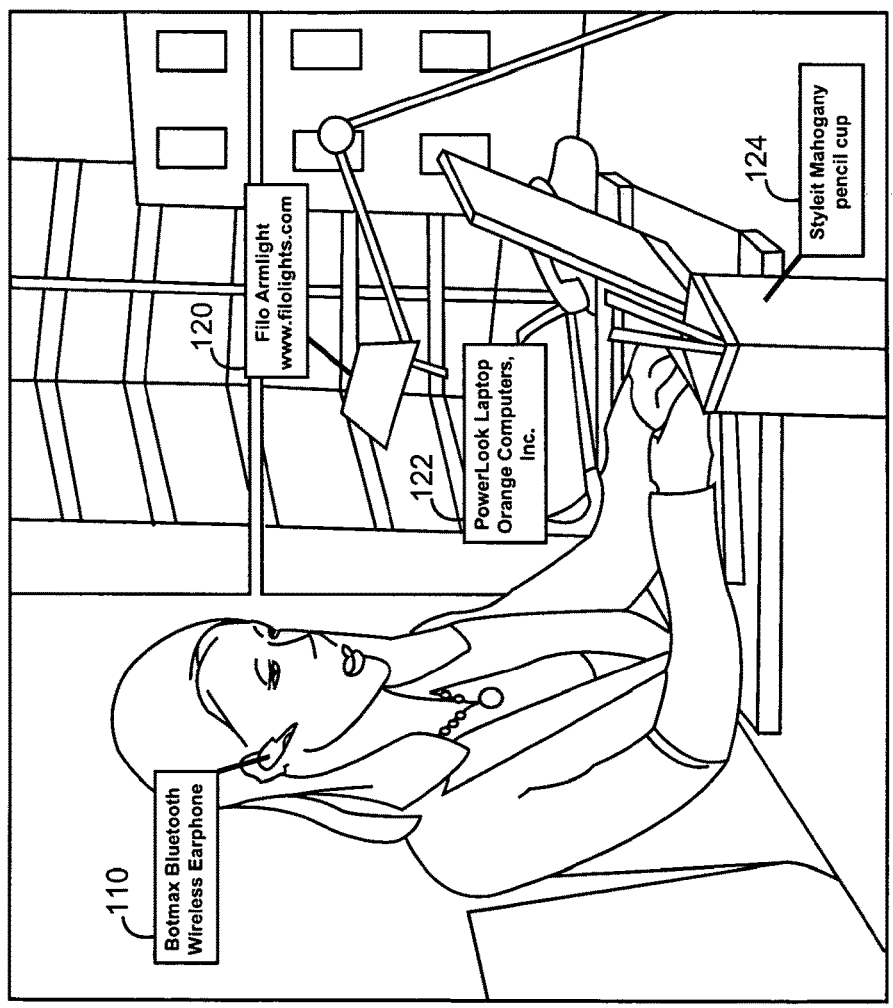
FIG. 1 shows a display of an image with tags added to the image according to one embodiment.

FIG. 1 shows a display of an image with tags added to the image according to one embodiment. In one embodiment, a user can select whether tags are displayed or not by using a user input device. For example, if the user is watching a video played back on a television via a DVD player or a cable box then the user can press a button on a remote control device to cause the tags to be displayed on a currently running video. Similarly, the user can deselect, or turn off, the tag display by depressing the same or a different button. If the user is watching video playback on a computer system a keyboard keypress can cause the tags to turn on or off. Or a mouse selection of an on-screen button or command can be used. Other embodiments can use any other suitable control for invoking tag displays. Displaying of tags can be automated as where a user decides to watch a show without tags for a first time and then automatically replay the show with tags a second time.

In FIG. 1, each tag is shown with a text box and lead line. The text box includes information relevant to an item that is pointed at by the lead line. For example, tag 110 states "Botmax Bluetooth Wireless Earphone" with a lead line pointing to the earphone that is in the ear of the woman who is the subject of the scene. Thus, a viewer who is interested in such things can obtain enough information from the tag to find a seller of the earphone. Or the viewer can do an online search for the earphone by manufacturer and/or model name and can obtain more information about the earphone as research prior to making a purchase.

Other tags such as 120, 122, and 124 provide information about other items in the frame. Tag 120 states "Filo Armlight www.filolights.com" to point out the manufacturer ("Filo") and model ("Armlight") and website (www.filolights.com) relating to the light to which tag 120 is connected via its lead line. Tags can include any type of interesting or useful information about an item or about other characteristics of the image frame or video scene to which the image frame belongs.

Tag 122 points to the laptop on which the woman is typing and states "PowerLook Laptop I Orange Computers, Inc." This shows the model and manufacturer of the laptop. Tag 124 points to the pencil holder and reads "Stylelt Mahogany pencil cup." Note that more, less or different information can be included in each tag, as desired, by the company that is managing the tag advertising ("tagvertising") of the particular video content.

Information for the tags is received from users to generate the video tags shown in the final video as seen in FIG. 1. The users may be referred to as sponsors and may purchase the tags for the rights to display information in them. The purchase may be for a monetary value or for any other consideration, such as the use of products in the video, free advertising for the video, etc. Particular embodiments allow a sponsor to specify tag information during a production process. This allows a video tag layout to be generated through the different stages of producing a video.

Figure 2:
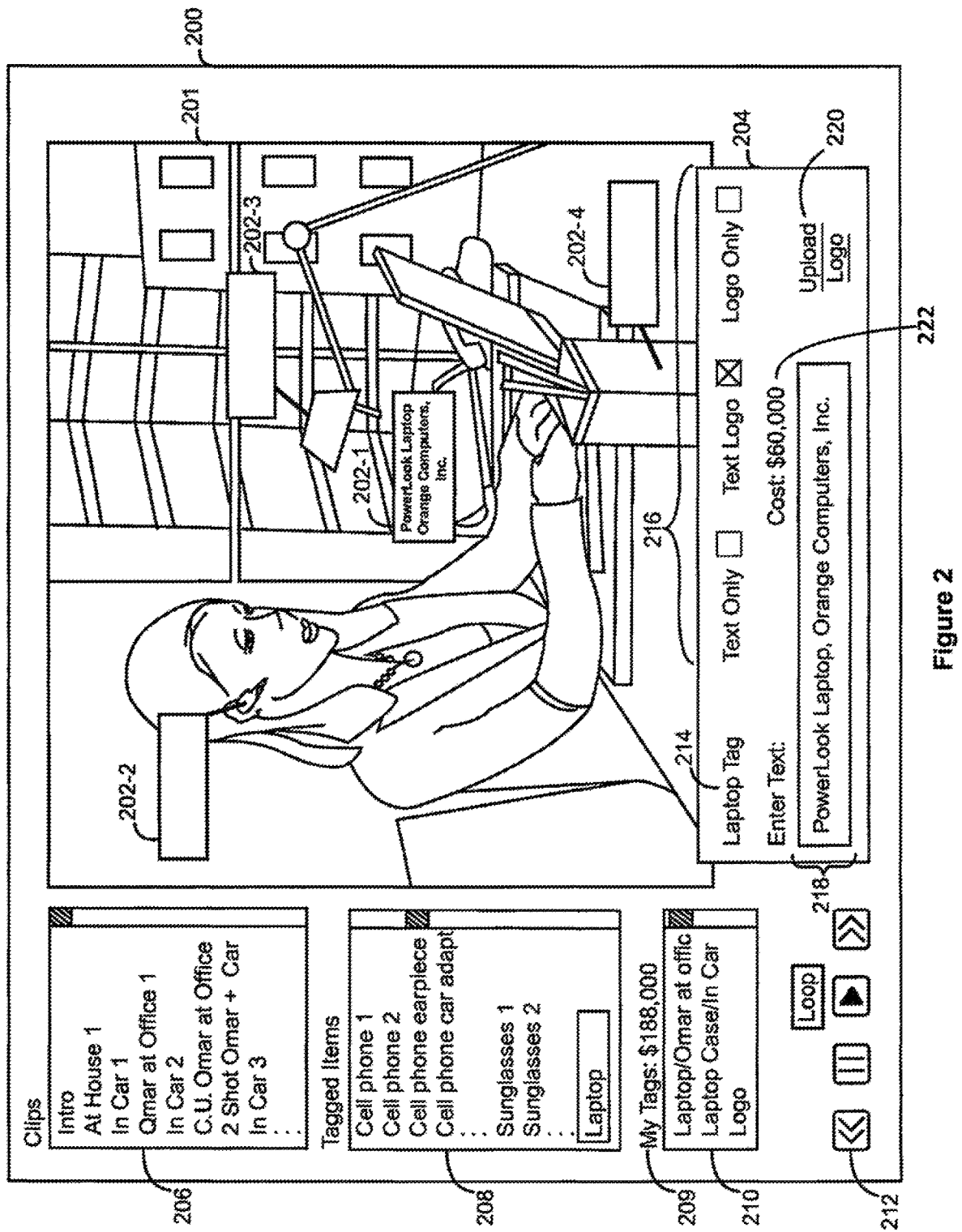
FIG. 2 shows an example of an interface for allowing a specification of a video tag layout according to one embodiment.

FIG. 2 shows an example of an interface 200 for allowing a specification of a video tag layout according to one embodiment. As shown, video tags 202 are provided in image 201. Video tags 202 do not include tag information until video tag information is received from a user. For example, video tags 202-2, 202-3, and 202-4 do not include any tag information. These tags may be considered placeholder tags, which show where a possible video tag may be inserted in image 201.

In one embodiment, tags 202 are available for a user to purchase or sponsor, and interface 200 may be used to indicate an interest in the purchase. A tag information input box 204 is provided to allow a user to specify tag information for tags 202. Although box 204 is provided, it will be understood that other methods of inputting tag information will be appreciated. For example, a user may use another interface to input tag information.

The tag information may be any characteristics for a tag, such as the kind of tag, text for the tag, a logo for the tag, etc. Input box 204 provides various input areas where information for characteristics of the tag can be specified. For example, an area 214 indicates which item is currently being selected for tag 202. In this case, the laptop tag 202-1 has been selected.

In area 216, the type of tag can be selected. The choices here are a text only tag, a text and logo tag, and a logo only tag. Other types of tags may also be provided.

An area 218 allows the user to enter text for the tag. In this case, the user has entered "Powerlook Laptop, Orange Computers, Inc." This text then appears in video tag 202-1. The text may appear in tag 202 in real-time as the user types in the text or after the user finishes typing. Thus, the video tag 202 may be formatted for a user to see how it looks in image 201.

An upload logo option 220 allows a user to upload a logo. For example, a company logo may be uploaded from the Internet or storage.

Particular embodiments allow a user to see how the tag will be used in the scene. This may allow a user to see the context of how the tag or item is used in image 201, which may be important. For example, if one item in the scene is something that will cause a user to display tags, then it may be desirable to have a tag 202 in that scene. In one example, if a popular telephone appears in a scene, then having a tag for another item in the scene may be valuable because it may be more likely that a user decides to show the tags for that scene when the telephone is shown. Thus, users can see the scene and then specify which tags 202 are desired using interface 200.

Also, when viewing a scene, a user can see how an item is being portrayed. For example, if the scene involves two people falling in love, then that may be a better scene to have an item than if the people are fighting. Thus, interface 200 allows the user to see the context of how tags are going to be portrayed in the scene.

A cost area 222 shows an estimate of the cost of the tags. The cost of the tags may be computed in real-time as the tag information is input. For example, a user can change from a text only tag to a text and logo tag, and see the cost change. The cost may be estimated based on a number of factors. For example, a value of the tag may be assigned based on the context or item it is associated with.

Figure 3:
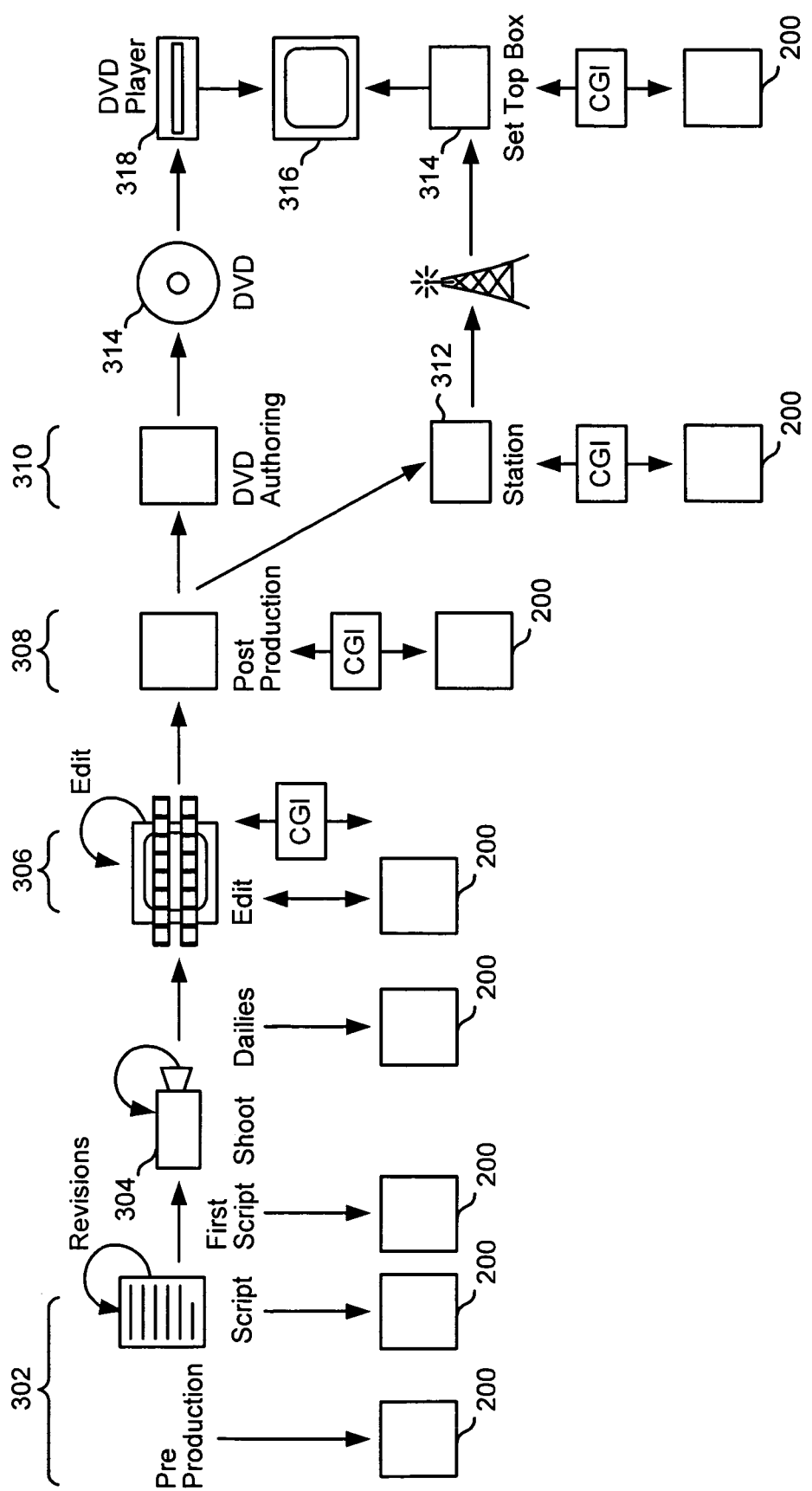
FIG. 3 depicts an example of a production process according to one embodiment.

Interface 200 may be used during a production process for the video. FIG. 3 depicts an example of a production process according to one embodiment. It will be recognized that variations in the production process will be appreciated. During each stage, interface 200 may be accessed to input tag information for tags 202.

As shown in FIG. 3, the various different stages of the production process include a pre-production stage and script stage 302. FIG. 3 is but one possible selection and illustration of stages in a production process. Various features of the invention can be adapted for use with any suitable presently known or future-developed production, post-production, distribution, release or other stages in the life of a video clip or production. In stage 302, the script is written and revised. During this time, tag information for video tags may be input for items. For example, interface 200 may be used to input the tag information for items found in the script. In one example, when tag information is input, it may appear in a column in the script. In this case, someone reading the script can see that a user has requested sponsorship for a tag in the script. Thus, before the video is even shot, the tags may be sponsored. This may allow a director to see which scenes in the script have been deemed valuable by sponsors.

In one embodiment, interface 200 may be used to generate the tag information for tags in the script. Although FIG. 2 shows an image of video, the image could be an electronic copy of the script. In this case the tag information may be input in a column of an electronic copy of the script.

In a shooting stage 304, scenes or parts of scenes defined by the script are shot. The shooting may include many different takes. Also, each day, dailies are produced that include the video that was shot for the day. Interface 200 may be used to specify which tags a user is interested in for any of the takes. As dailies are produced, a user may use interface 200 to review the dailies or other portions of visual content being created and input tag information for tags 202 onto or in association with the content.

In an editing stage 306, the video shot is edited into the final video. During this time, the final edit may be performed and then users may know which scenes are in the final video. Interface 200 may then be used to finalize the tag information for tags 202.

In a post-production stage 308, color, effects, and other features of the video may be adjusted. At this time, interface 200 may also be used to input tag information. Also, a computer graphics insertion step may be provided. When the video is shot, one may not know who wants to sponsor the item. Accordingly, the item may be shot without any notion of a brand. For example, the item may not be company specific. Computer graphics insertion may be used to excise the name for an item and to insert a new name in place of the old name. Thus, any brand can tag an item. Also, generic items may be used in the video. Thus, if a first company tags an item, that company's name may be inserted onto a generic item. It should be noted that computer graphics insertion may be performed at other stages, such as post-production stage 308, DVD authoring stage 310, etc.

After the post-production stage 308, a DVD authoring stage 310 or digital broadcast stage 312 is performed. DVD authoring stage 310 authors a DVD 314. The DVD may be played on a DVD player 318. Broadcast stage 312 broadcasts the video through a network, such as a cable or satellite network. The video may go through a set top box 314 and is displayed on a display device 316, such as a television. Also, tags may be inserted into the video through set top box 314, DVD player 318, or another computing device during playback of the video.

Referring back to FIG. 2, elements of interface 200 may be used during the stages described above. For example, a clips entry box 206 shows various clips in the video. These clips may be provided from shooting stage 304 (e.g., the dailies). As shown, different takes are provided, such as an "In Car 1" clip, an "In Car 2" clip, and an "In Car 3" clip. Thus, three takes of a scene in a car may have been taken. Users may select one of these clips and specify tag information for a tag 202 in the clips.

When a clip is selected in clip entry box 206, the items in the clip may be tagged. For example, a tagged items entry box 208 displays the possible items in a clip selected in clips entry box 206. Tagged items entry box 208 may then be used to select an item in image 201. Thus, when one of the clips is selected, an item can be selected in tagged items entry box 208.

As stages in the production process proceed, the information in clips entry box 206 and tagged entry box 208 may change. However, tag information may persist even if the items in scenes change or scenes are deleted or not used. For example, if the user has specified a desire for a tag in the clip "In Car 1", but that clip does not make it into the final cut, the tag may be moved into the final scene that makes it into the video such as the clip "In Car 2". The user who wanted the tag may be notified that the tag has been moved and be given a choice to not sponsor the tag. The transfer of the tag may be performed automatically by linking clips that are related. For example, all "In Car N" clips may be linked. In another embodiment, inputting tag information for a tag in one clip may cause the information to be propagated to all related clips. This ensures that the tag information is in a tag if a take of the scene is used in the video.

When the user has specified the information for the tag, a total cost for all the tags a user has purchased may be shown in a price area 209. A control area 212 also allows the user to navigate through the video. For example, the user may fast forward, rewind, pause, and play the video. As the user navigates through the video, the clips highlighted in clips entry box 206 may change as the clips are viewed in interface 200.

During the production process, if it is decided that a clip will definitely be in the final edit, clip entry box 206 may provide an indication that the clip is final. This allows users to know for certain that their tag would be in a clip that would definitely be shown in the video.

A tag overview area 210 shows all the tags a user has purchased. Also, a tag overview for all the tags in the video may be provided. The tag overview may also be filtered by sponsor, group of clips, etc. FIG. 4 depicts an example of a table 400 that shows a summary of tagged items according to one embodiment. As shown, a tagged item column 402, a time on screen column 404, a rating column 406 and a price column 408 are provided.

Tagged item column 402 shows a list of tags in the video. Time on screen column 404 shows the time that the item is on the screen. For example, a first cell phone, cell phone 1, is shown on the screen for 21 seconds. This allows the user to see how long a tag may be shown, which, in effect, shows the amount of advertising time.

Rating column 404 shows a rating for the tag. This may be a rating that values how important the tag may be with respect to other items. For example, a rating of 1 indicates that the item is considered the most valuable. This may factor into how much a tag for the item may cost. The ratings may be determined based on a number of factors. For example, how prominent the item is in the scene may be one factor. For example, if a cell phone is being used by the main actor, this may provide a more favorable rating. Also, if the item is in a scene with a desirable item, the item may be considered more valuable.

Price column 408 indicates the price for the tag. For example, depending on the information desired in the tag and other factors, such as the rating and time on screen, the price may be determined. The price may also vary based on the type of tag, such as a text only tag may cost less than a text and logo tag.

Figure 5:
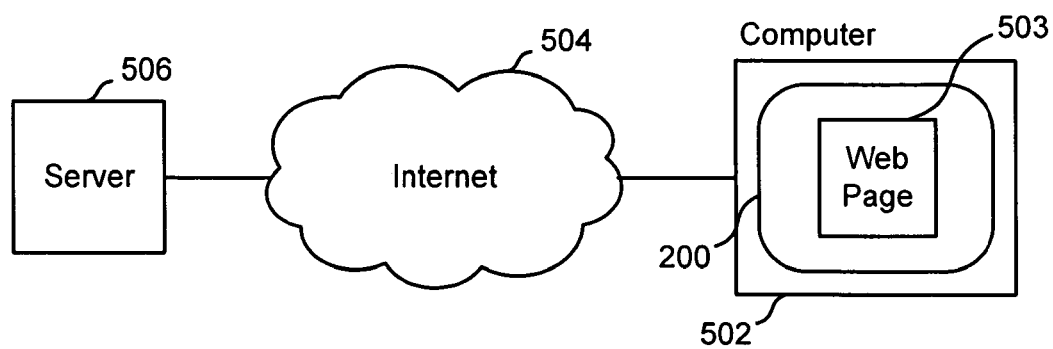
FIG. 5 shows an example of a system that may be used to input tag information according to one embodiment.

FIG. 5 shows an example of a system 500 that may be used to input tag information according to one embodiment. As shown, a user device 502, a network 504 and a server 506 are provided. User device 502 may be any computing device, such as a personal computer, laptop computer, cellular phone, etc. Interface 200 may be shown on computer 502. For example, a web page 508 may be displayed that includes interface 200.

User device 502 interacts with server 506 to download information for interface 200. For example, the video sequence may be downloaded. The user may then enter tag information in interface 200. When the tag information has been entered and is ready for submission, it may be uploaded to server 506 and is stored. Also, the tag information may be stored locally at user device 502 or in any other area. For example, the tag information may be forwarded to a tagging service that is handling the tagging service of the video sequence.

Figure 6:
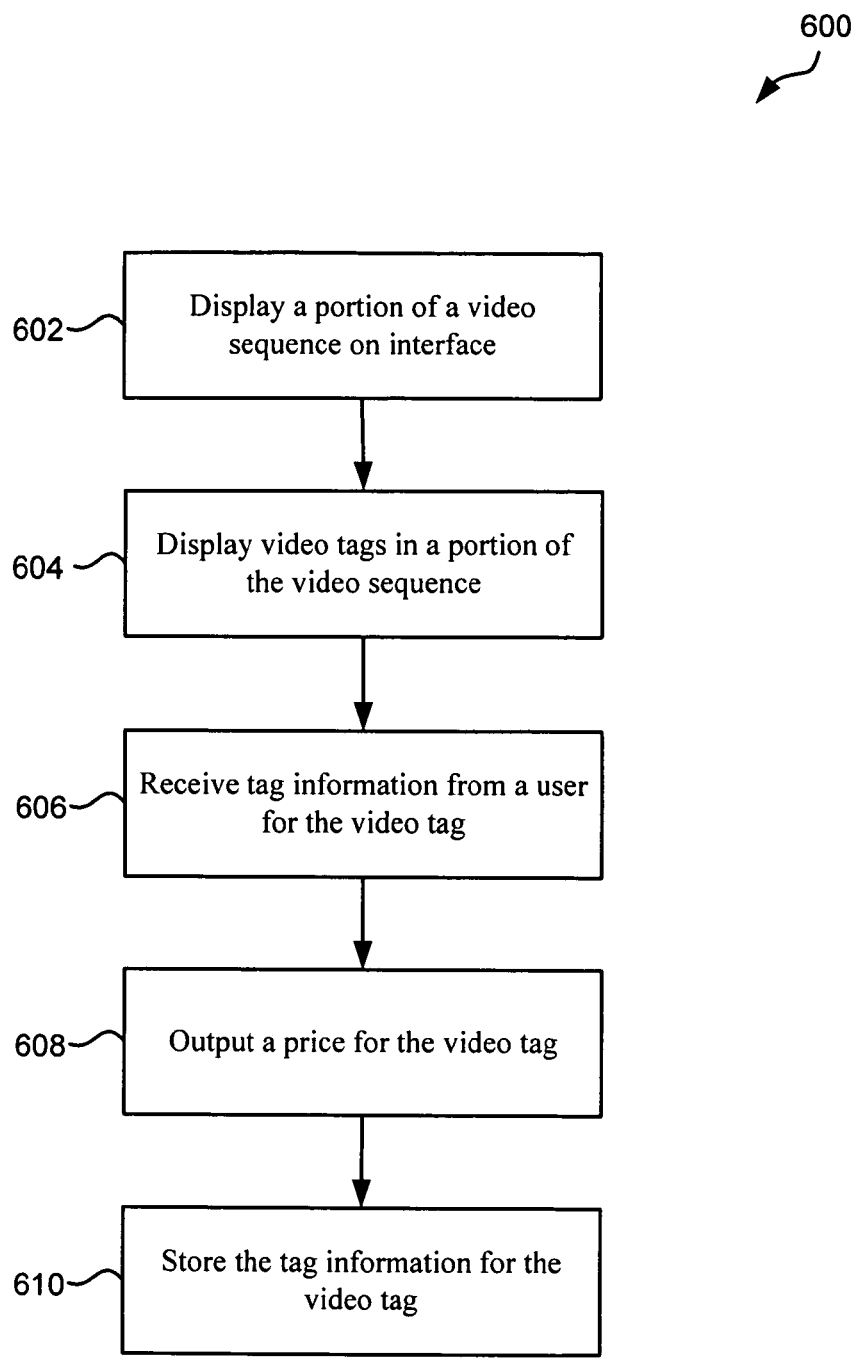
FIG. 6 shows an example of a simplified flowchart of a method for providing a video tag layout according to one embodiment.

FIG. 6 shows an example of a simplified flowchart 600 of a method for providing a video tag layout according to one embodiment. Step 602 displays a portion of a video sequence on interface 200. The portion may be an image or scene from the video sequence.

Step 604 displays video tags in a portion of the video sequence. For example, video tags that are available for purchase are displayed. The layout of the video tags is provided but until the video tags are purchased, information in the video tags is not displayed. Rather, a placeholder to show where the video tags would be displayed in the portion of the video sequence is shown. In other embodiments, example text or other information can be provided in the "blank" tags such as to show how text size, font and layout might fit into the tag, to provide information such as the cost of the tag, estimated number of viewers, etc. Input area 202 is then provided to allow the input of tag information for the video tag. Further areas described in FIG. 2 may also be displayed.

Step 606 then receives tag information from a user for the video tag. For example, the user may input which characteristics are desired for a video tag.

Step 608 then outputs a price for the video tag. For example, particular embodiments calculate the price based on the tag information input.

Step 610 then stores the tag information for the video tag. For example, the tag information may be associated with the portion of the video sequence. Accordingly, when other users view the portion of the video sequence, they may see that a user has already indicated interest in a tag. Thus, the second user may decide to try to outbid the user for the tag or may want to sponsor another tag in the portion of the video sequence.

Accordingly, particular embodiments allow the user to specify tag information for tags 202 at any point in the production process. Thus, when content is shot, tag information may be specified in the dailies. Also, when a script is being written, tags may be specified in an electronic version of the script, etc. The user can define the tag information for the tag and see how the tag looks in the scene. Also, the owner of the video can see what tags have been purchased and may base decisions on what to include in the video based on the tag information. For example, if users have agreed to purchase a large number of tags in a scene, then a director may decide to keep that scene in the movie.

Although the description has been described with respect to particular embodiments thereof, these particular embodiments are merely illustrative, and not restrictive. For example, although embodiments of the invention have been presented primarily in connection with standard methods for video creation or production, any type of visual presentation (e.g., animation, computer rendering, live action, etc.) and any manner of creating the visual presentation may be suitable with features described herein.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time. The sequence of operations described herein can be interrupted, suspended, or otherwise controlled by another process, such as an operating system, kernel, etc. The routines can operate in an operating system environment or as stand-alone routines occupying all, or a substantial part, of the system processing. Functions can be performed in hardware, software, or a combination of both. Unless otherwise stated, functions may also be performed manually, in whole or in part.

In the description herein, numerous specific details are provided, such as examples of components and/or methods, to provide a thorough understanding of particular embodiments. One skilled in the relevant art will recognize, however, that a particular embodiment can be practiced without one or more of the specific details, or with other apparatus, systems, assemblies, methods, components, materials, parts, and/or the like. In other instances, well-known structures, materials, or operations are not specifically shown or described in detail to avoid obscuring aspects of particular embodiments.

A "computer-readable medium" for purposes of particular embodiments may be any medium that can contain, store, communicate, propagate, or transport the program for use by or in connection with the instruction execution system, apparatus, system, or device. The computer readable medium can be, by way of example only but not by limitation, an electronic, magnetic, optical, electromagnetic, infrared, or semiconductor system, apparatus, system, device, propagation medium, or computer memory.

Particular embodiments can be implemented in the form of control logic in software or hardware or a combination of both. The control logic, when executed by one or more processors, may be operable to perform that what is described in particular embodiments.

A "processor" or "process" includes any human, hardware and/or software system, mechanism or component that processes data, signals, or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems.

Reference throughout this specification to "one embodiment", "an embodiment", "a specific embodiment", or "particular embodiment" means that a particular feature, structure, or characteristic described in connection with the particular embodiment is included in at least one embodiment and not necessarily in all particular embodiments. Thus, respective appearances of the phrases "in a particular embodiment", "in an embodiment", or "in a specific embodiment" in various places throughout this specification are not necessarily referring to the same embodiment. Furthermore, the particular features, structures, or characteristics of any specific embodiment may be combined in any suitable manner with one or more other particular embodiments. It is to be understood that other variations and modifications of the particular embodiments described and illustrated herein are possible in light of the teachings herein and are to be considered as part of the spirit and scope.

Particular embodiments may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

Additionally, any signal arrows in the drawings/Figures should be considered only as exemplary, and not limiting, unless otherwise specifically noted. Furthermore, the term "or" as used herein is generally intended to mean "and/or" unless otherwise indicated. Combinations of components or steps will also be considered as being noted, where terminology is foreseen as rendering the ability to separate or combine is unclear.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The foregoing description of illustrated particular embodiments, including what is described in the Abstract, is not intended to be exhaustive or to limit the invention to the precise forms disclosed herein. While specific particular embodiments of, and examples for, the invention are described herein for illustrative purposes only, various equivalent modifications are possible within the spirit and scope, as those skilled in the relevant art will recognize and appreciate. As indicated, these modifications may be made to the present invention in light of the foregoing description of illustrated particular embodiments and are to be included within the spirit and scope.

Thus, while the present invention has been described herein with reference to particular embodiments thereof, a latitude of modification, various changes and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit. It is intended that the invention not be limited to the particular terms used in following claims and/or to the particular embodiment disclosed as the best mode contemplated for carrying out this invention, but that the invention will include any and all particular embodiments and equivalents falling within the scope of the appended claims.

The invention claimed is:

1. A method for facilitating a user to add a tag to a video scene during a production process of a video, the method comprising:
    causing a video display device to display, during the production process of the video, the video scene with a set of at least one placeholder tag appearing on the video during at least a portion of the video scene, wherein each placeholder tag is associated with an item depicted in the video, each placeholder tag initially having no content;
    receiving, from the user, a selection of one of the set of at least one placeholder tag, thereby resulting in a selected placeholder tag associated with a selected item depicted in the video;
    receiving, from the user, input specifying a tag type for the selected placeholder tag, wherein the specified tag type is one of multiple different possible tag types, wherein the multiple different possible tag types comprise text-only, logo-only, and text-and-logo tag types;
    receiving, from the user, input specifying content for the selected placeholder tag; and
    receiving, from the user, approval of the video scene with the selected placeholder tag, of the specified type, and having the specified content.

2. A method according to claim 1, wherein the set of at least one placeholder tag is overlaid on the video during at least a portion of the video scene.

3. A method according to claim 1, wherein the user is affiliated with a sponsor.

4. A method according to claim 1, further comprising:
    providing an input area that allows the content specified by the user to be input.

5. A method according to claim 1, further comprising:
    causing the video display device to display a list of scenes available in the video; and
    receiving a selection of a scene from the list of scenes, thereby resulting in the video scene.

6. A method according to claim 5, wherein a scene in the list of scenes is generated from a production process for the video.

7. A method according to claim 1, wherein the method is performed before a DVD authoring stage.

8. A method according to claim 1, wherein the method is performed before a video broadcast stage.

9. A method according to claim 1, further comprising:
    repeatedly previewing at least a portion of the video scene with the selected placeholder tag overlaid on the video during at least a portion of the video scene.

10. A method according to claim 1, wherein the content for the selected placeholder tag includes a computer graphic that is associated with a brand.

11. A method according to claim 1, wherein the tag type is a logo tag type, and the tag content is a logo.

12. A method according to claim 1, further comprising:
    causing the video display device to display a sponsorship value for the selected placeholder tag.

13. A method according to claim 12, further comprising:
    calculating the sponsorship value for the selected tag.

14. A method according to claim 12, wherein the selected placeholder tag has associated with it a rating relative to other placeholder tags.

15. A method according to claim 14, wherein the sponsorship value is based at least in part on the rating.

16. A method according to claim 12, wherein each placeholder tag is characterized by size, shape, temporal duration, and spatial location properties with respect to the video scene.

17. A method according to claim 16, wherein the sponsorship value depends at least in part on one or more of the associated items, the content specified by the user, and one of the tag's properties.

18. A method for facilitating a user to customize a video scene during a production process of a video, the method comprising:
    causing a video display device to display, during the production process of the video, the video scene with at least one tag appearing on the video during at least a portion of the video scene, wherein the tag is associated with an item depicted in the video;
    receiving, from the user, input specifying a tag type for a selected tag, wherein the specified tag type is one of multiple different possible tag types, wherein the multiple different possible tag types comprise text-only, logo-only, and text-and-logo tag types;
    receiving, from the user, input specifying content for the selected tag; and
    receiving, from the user, input specifying computer-generated graphic content to appear on the item depicted in the video and associated with the selected tag, of the specified type, and having the specified content, wherein the computer-generated graphic content comprises one or more of a logo or brand name for the item.

19. A method according to claim 18, wherein said at least one tag is overlaid on the video during at least a portion of the video scene.

20. A method according to claim 18, wherein the user is affiliated with a sponsor.

21. A method according to claim 18, further comprising:
    providing an input area that allows the content specified by the user to be input.

22. A method according to claim 18, further comprising:
    causing the video display device to display a list of scenes available in the video; and
    receiving a selection of a scene from the list of scenes, thereby resulting in the video scene.

23. A method according to claim 22, wherein a scene in the list of scenes is generated from a production process for the video.

24. A method according to claim 18, wherein the method is performed before a DVD authoring stage.

25. A method according to claim 18, wherein the method is performed before a video broadcast stage.

26. A method according to claim 18, further comprising: calculating a price for the selected tag.

27. A method according to claim 18, further comprising: repeatedly previewing at least a portion of the video scene with the selected tag overlaid on the video during at least a portion of the video scene.

28. A method according to claim 18, wherein said at least one tag has associated with it a rating relative to tags on the video scene.

29. A method according to claim 28, wherein the rating is based on relative prominence of said at least one tag relative to other tags.

30. A method according to claim 28, wherein a sponsorship value for the at least one tag is based at least in part on the rating.

31. A method according to claim 18, wherein said at least one tag is characterized by size, shape, temporal duration, and spatial location properties with respect to the video scene.

32. A method according to claim 31, wherein a sponsorship value for said at least one tag depends at least in part on one or more of the associated items, the content specified by the user, and one of the tag's properties.

33. A method according to claim 18, wherein said at least one tag is a placeholder tag initially having no content.

34. A method according to claim 18, further comprising: receiving, from the user, input specifying computer-generated graphic content to appear on the item depicted in the video and associated with the selected tag, of the specified type, and having the specified content, wherein the computer-generated graphic content comprises one or more of a logo or brand name for the item.

35. A non-transitory computer-readable medium on which are stored instructions executable by a processor operating in conjunction with a video display device to facilitate a user to add a tag to a video scene during a production process of a video, the instructions comprising:

instructions to cause a video display device to display, during the production process of the video, the video scene with a set of at least one placeholder tag appearing on the video during at least a portion of the video scene, wherein each placeholder tag is associated with an item depicted in the video, each placeholder tag initially having no content;

instructions to receive, from the user, a selection of one of the set of at least one placeholder tags, thereby resulting in a selected placeholder tag associated with a selected item depicted in the video;

instructions to receive, from the user, input specifying a tag type for the selected placeholder tag, wherein the specified tag type is one of multiple different possible tag types, wherein the multiple different possible tag types comprise text-only, logo-only, and text-and-logo tag types;

instructions to receive, from the user, input specifying content for the selected placeholder tag; and instructions to receive, from the user, approval of the video scene with the selected tag having its content.

36. A non-transitory computer-readable medium on which are stored instructions executable by a processor operating in conjunction with a video display device to facilitate a user to customize a video scene during a production process of a video, the instructions causing the processor to execute a method, the method comprising:

causing a video display device to display, during the production process of the video, the video scene with at least one tag appearing on the video during at least a portion of the video scene, wherein the tag is associated with an item depicted in the video;

receiving, from the user, input specifying content for a selected tag;

receiving, from the user, input specifying a tag type for the selected tag, wherein the specified tag type is one of multiple different possible tag types, wherein the multiple different possible tag types comprise text-only, logo-only, and text-and-logo tag types; and receiving, from the user, input specifying computer-generated graphic content to appear on the item depicted in the video and associated with the selected tag, wherein the computer-generated graphic content comprises a logo for the item.

* * * * *